United States Patent [19]

Scott

[11] Patent Number: 4,911,214

[45] Date of Patent: Mar. 27, 1990

[54] UNIVERSAL ROUTER TRAMMEL

[76] Inventor: George V. Scott, 581 Elmhurst Road, Winnipeg, Manitoba, Canada, R3R OV2

[21] Appl. No.: 385,401

[22] Filed: Jul. 27, 1989

[51] Int. Cl.4 .............................................. B27C 5/10
[52] U.S. Cl. .................. 144/134 D; 33/42; 33/27.04; 144/136 C; 144/137; 144/253 R; 409/182
[58] Field of Search ............... 33/27.04, 41.5, 42; 409/130, 182, 180, 241; 144/134 R, 134 D, 136 R, 136 C, 137, 1 F, 253 R

[56] References Cited

U.S. PATENT DOCUMENTS

| | | | |
|---|---|---|---|
| 3,376,787 | 4/1968 | Morganson | 409/182 |
| 3,635,268 | 1/1972 | Lange | 144/134 D |
| 4,044,805 | 8/1977 | Gronholz | 144/134 D |
| 4,062,390 | 12/1977 | Beekenkamp | 144/134 D |
| 4,538,946 | 9/1985 | Bloch | 144/134 D |
| 4,685,496 | 8/1987 | Livick | 144/136 C |
| 4,688,613 | 8/1987 | Bassett | 144/136 C |
| 4,718,468 | 1/1988 | Cowman | 144/134 D |

*Primary Examiner*—W. Donald Bray
*Attorney, Agent, or Firm*—H. Jay Spiegel

[57] ABSTRACT

The present invention relates to a router trammel including several attachments and features which allow the user to operate a router to accurately and reproducibly create different designs and cuts on a piece of wood. The inventive device includes an adjustable miter gauge including a protractor device about which guide means may be swung to allow angular adjustments. Additional features include the use of a pivotable fence to guide long vertical cuts, a threaded rod designed to be used for additional clamping for rabbet cuts and mitre cuts, as well as an elongated beam slidably mounted to support means incorporated in the mitre gauge, which beam is removably attachable to a router device.

9 Claims, 7 Drawing Sheets

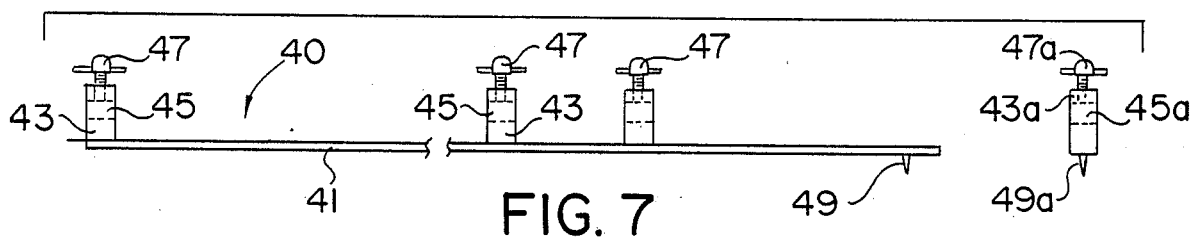
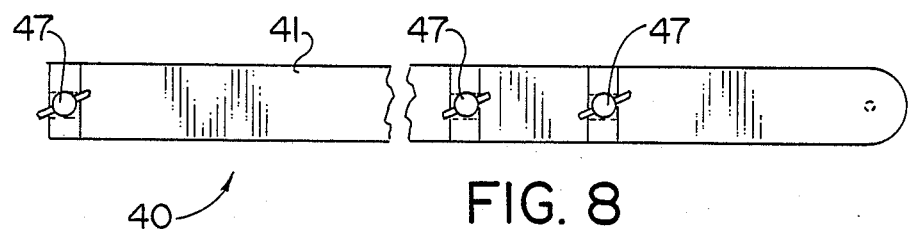
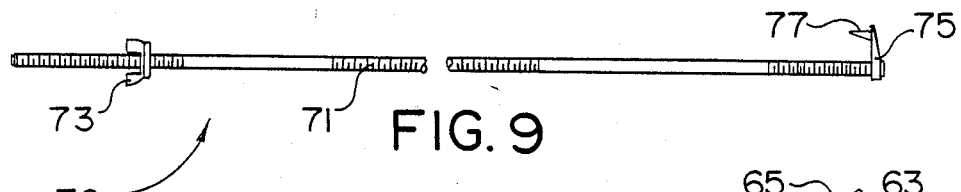
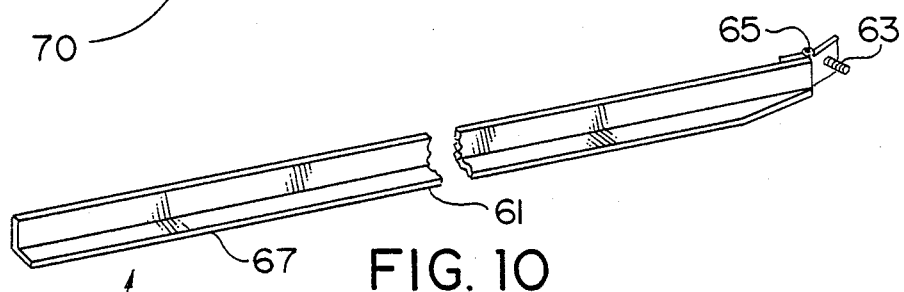
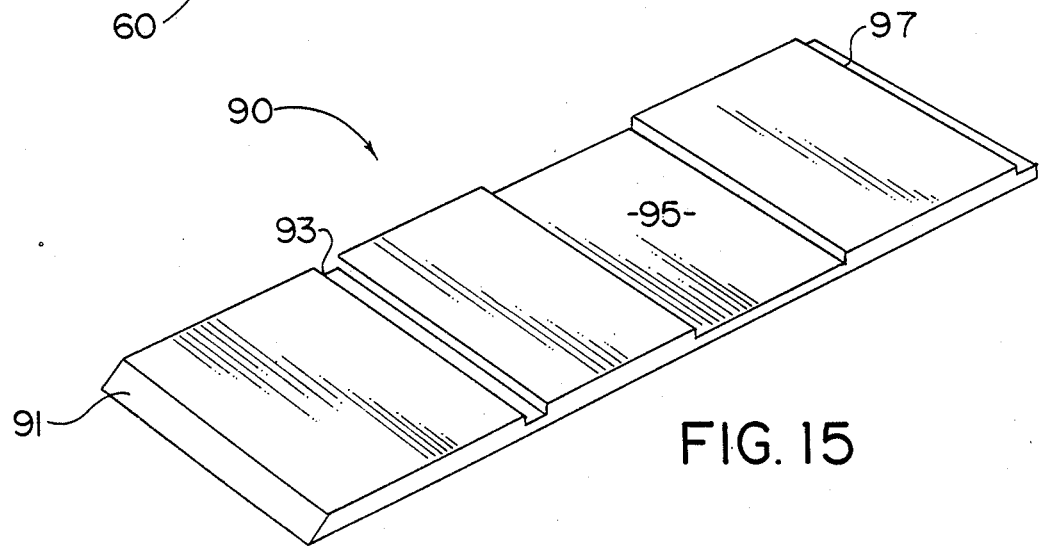

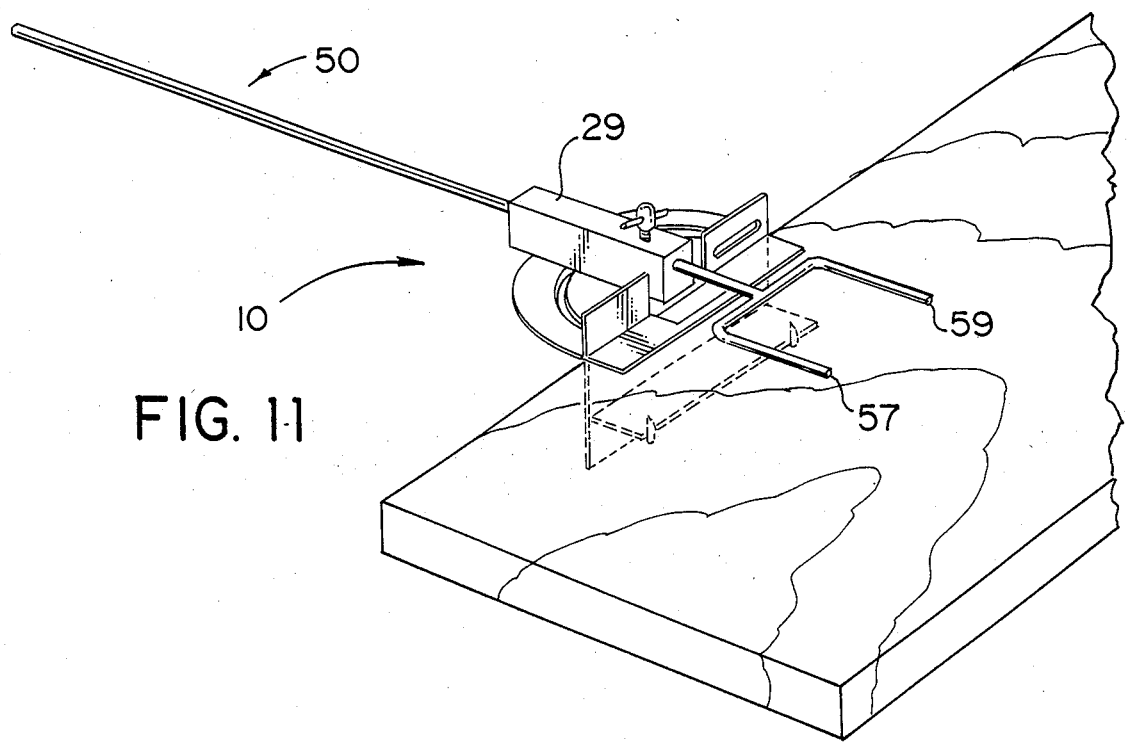
FIG. 1.1
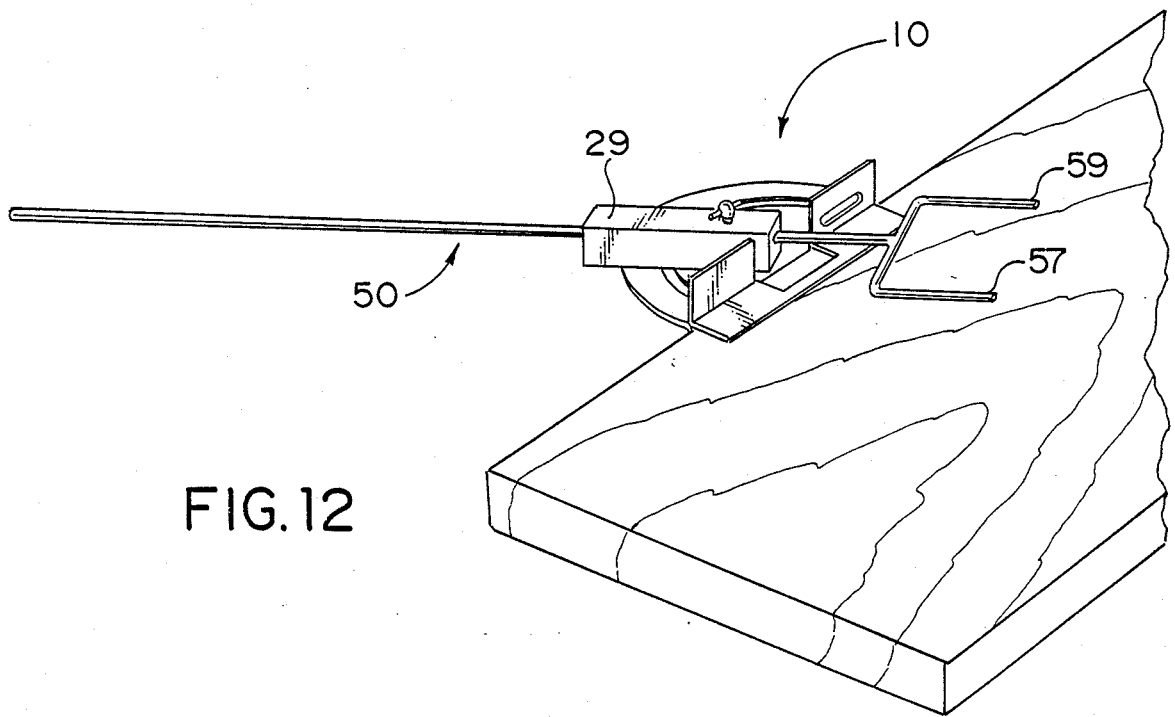
FIG. 12

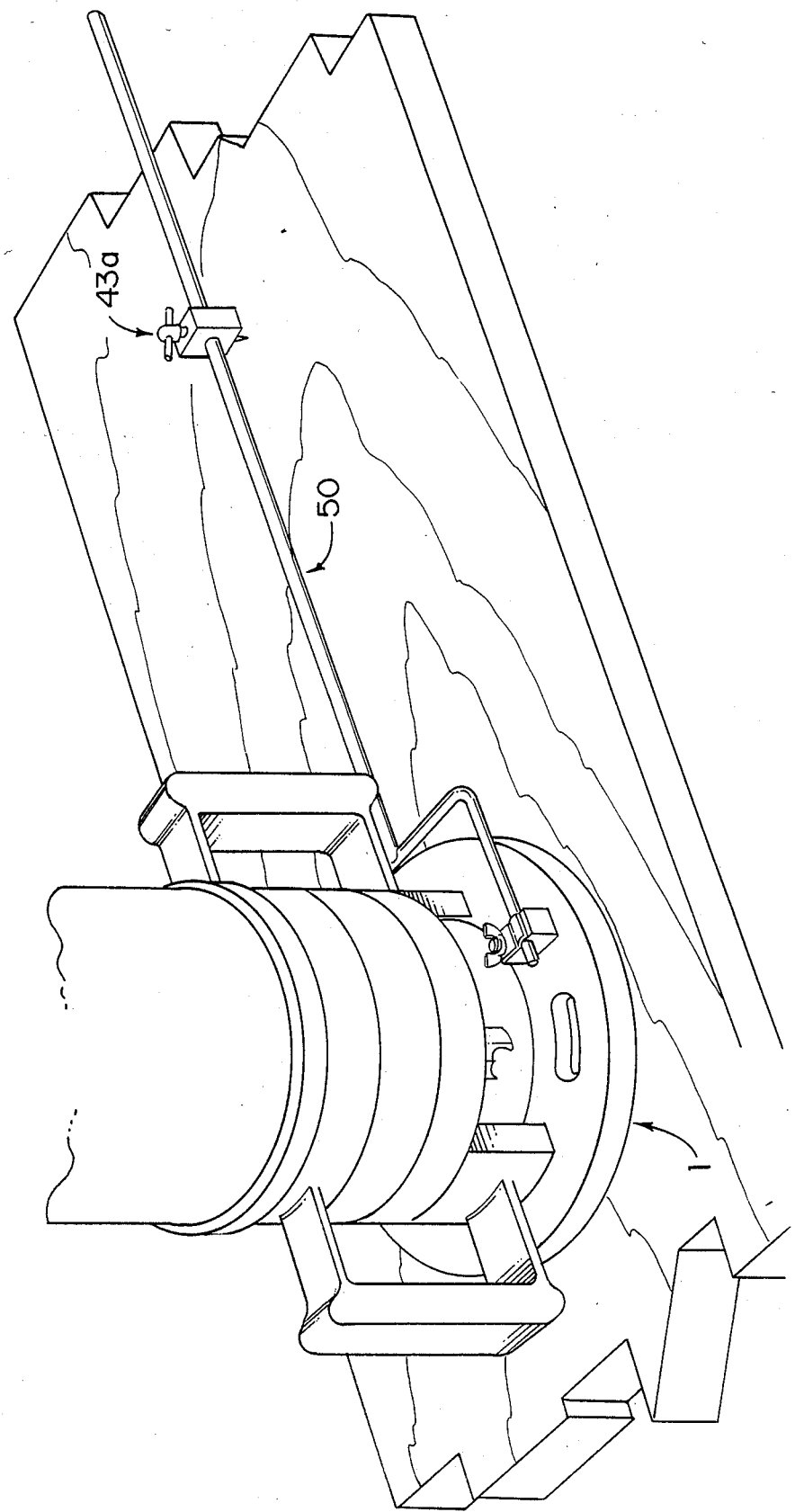

UNIVERSAL ROUTER TRAMMEL

BACKGROUND OF THE INVENTION

The present invention relates to a universal router trammel. In the prior art, devices designed to be used to guide a router are generally known. U.S. Pat. Nos. 4,685,496 to Livick and 4,688,613 to Bassett are known to applicant, but are believed to be only generally related to the teachings of the present invention.

The number of people who use woodworking tools in their own homes to create furniture, displays and other articles is increasing. With this increase, greater numbers of inexperienced carpenters are developing a need for woodworking tools which are simpler than those presently on the market and which may be used by inexperienced carpenters in performing woodworking operations so that work may be completed which may be favorably compared with work created by professional carpenters.

In particular, known guiding devices designed to be used to guide a router in its various movements are quite complicated in design, large, heavy and cumbersome and difficult to manipulate, set-up and operate. Those devices are generally limited to only one function, and are usually expensive. Given the need for simpler tools, as noted above, a particular need has developed for a device designed to be used in conjunction with a router to allow a router to be guided in its various operations accurately, simply, economically and effectively. It is with this need in mind that the present invention was developed.

SUMMARY OF THE INVENTION

The present invention relates to a universal router trammel. The present invention includes the following interrelated aspects and features:

(a) In a first aspect, the inventive router trammel includes an adjustable mitre gauge including a protractor structure having an arcuate guide slot formed therein.

(b) Adjustably attached to the mitre gauge is an elongated base having a plurality of upstanding guide means having aligned openings. The base includes means extending through the arcuate slot of the mitre gauge which may be selectively tightened to fix the angular position of the elongated base with respect to the mitre gauge protractor structure.

(c) A beam device is slidably mounted through the aligned openings of the plurality of upstanding guide means. The beam device includes attachment means at one end designed to be used to attach the beam device to the base plate of a router. Distal of the attachment means, the beam device is elongated and may either be slid freely through the plurality of upstanding guide means of the elongated base or may be tightened through the provision of tightening means on one or more of the guide means to fix its position with respect to the elongated base.

(d) Also detachably attachable to the mitre gauge is an elongated pivotable fence which is provided to enhance the ability of the inventive device to accurately guide a router for long vertical cuts. The fence is hingedly attached to the mitre gauge to best facilitate the creation of cuts known as dados, rabbets, and miters. The main function of the hinge structure, however, is to best allow the creation of a long angled cut. Also removably attachable to the mitre gauge is an elongated threaded rod having one end designed to be attached to the mitre gauge and the other end having a pointed termination designed to be inserted into a piece of wood through impaling of the pointed end at a location on the wood remote from the mitre gauge. This threaded rod is designed to be used in conjunction with the mitre gauge to facilitate additional clamping of the mitre gauge for the creation of rabbet and mitre cuts and also may be used, if desired, to make dados as shown in FIG. 16.

(e) Additional aspects of the present invention also exist. For example, a separate guide means may be provided which may be selectively and reciprocably slid over the beam device and may be tightened thereon at any position, with these guide devices also including a pointed end which may be embedded in a piece of wood in any location thereon to facilitate, along with the structure of the beam, the performance of circular cuts of adjustable radii.

Accordingly, it is a first object of the present invention to provide an improved universal router trammel.

It is a further object of the present invention to provide such a device having several components and structures which may be combined together in various ways to allow a router attached thereto to perform various operations.

It is a yet further object of the present invention to provide a system designed to be attachable to a router, which system may easily be adjusted, changed, and altered by variations in orientations of the various parts thereof, quickly and efficiently.

It is a still further object of the present invention to provide such a device which makes it easier for a novice carpenter to perform operations with a router which heretofore could only be effectively performed by an experienced carpenter.

These and other objects, aspects and features of the present invention will be better understood from the following detailed description of the preferred embodiments when read in conjunction with the appended drawing figures.

BRIEF DESCRIPTION OF THE DRAWINGS

FIG. 7 shows a side view of a base forming a part of the inventive system.

FIG. 8 shows a top view of the base shown in FIG. 7.

FIG. 9 shows a threaded rod clamp forming a part of the inventive system.

FIG. 10 shows a side perspective view of a fence forming a part of the inventive system.

FIG. 11 shows a top perspective view of certain of the parts of the inventive system assembled together.

FIG. 12 shows a view similar to that of FIG. 11, but with the orientation of certain ones of the parts changed.

FIG. 14 shows a top perspective view of certain ones of the parts of the inventive system assembled together.

FIG. 15 shows a perspective view of a piece of wood with various cuts formed therein by the inventive system.

SPECIFIC DESCRIPTION OF THE PREFERRED EMBODIMENTS

Figure 13:
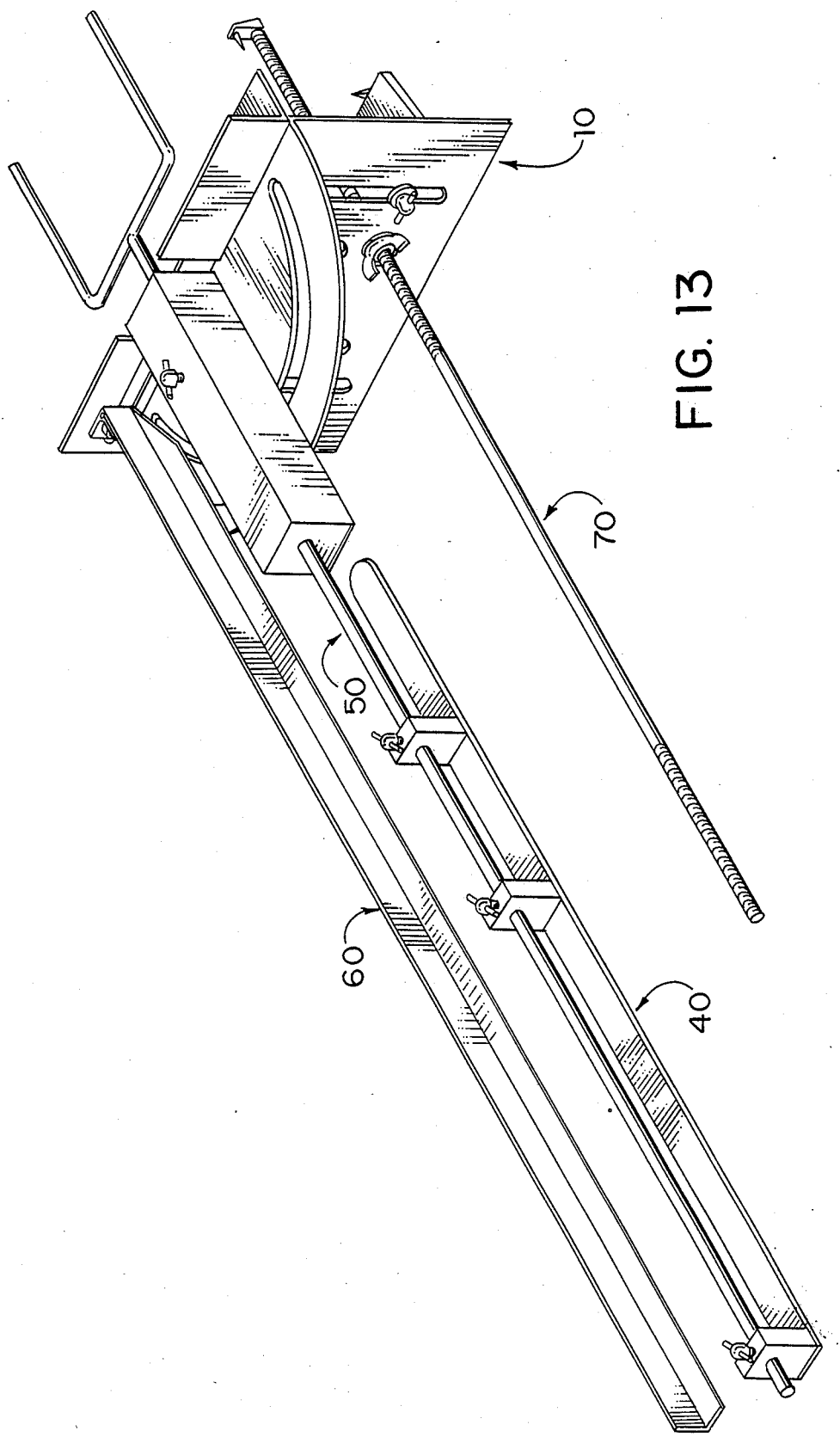
FIG. 13 shows a top view of all of the parts of the inventive system assembled together.

With reference, first, to FIG. 13, it is seen that the inventive system is generally designated by the reference numeral 1 and is seen to include an adjustable mitre gauge 10, a base 40, a beam 50, a fence 60, and a threaded rod clamp 70. A small detachable sleeve 43a is shown in FIG. 14.

With reference to FIGS. 1-4, the adjustable mitre gauge 10 is seen to include a top plate 11 having a first portion 13 and a second portion 15. The first portion 13 of the top plate 11 combines with a vertically adjustable bottom plate 17 to allow the adjustable mitre gauge 10 to be clamped on the edge of a piece of wood. The bottom plate 17 includes upstanding pointed members 19 which dig into the wood from the underside thereof to best retain the mitre gauge 10 in mounted position. Fasteners 21 are provided which allow fastening of the bottom plate 17 at any vertical position along the slots 23. The fasteners 21 may include threaded shafts attached to the bottom plate 17 and wing nuts or, if desired, may include wing bolts extending through openings formed in the bottom plate 17 and fastened thereon through the use of respective nuts. Alternatively, a vise gripping-type clamping system may be used.

Figure 1:
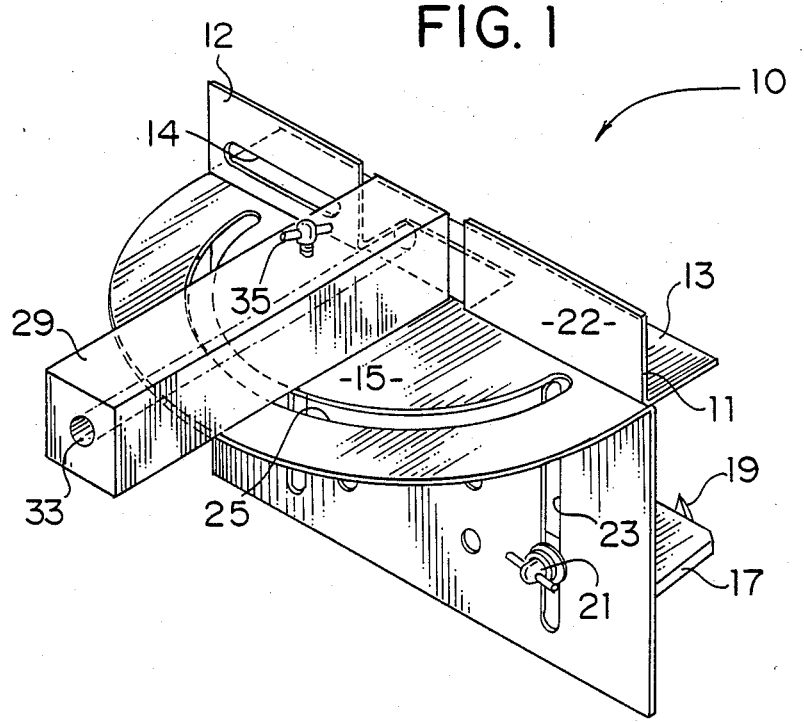
FIG. 1 shows a perspective view of an adjustable mitre gauge which forms a part of the inventive system.
Figure 2:
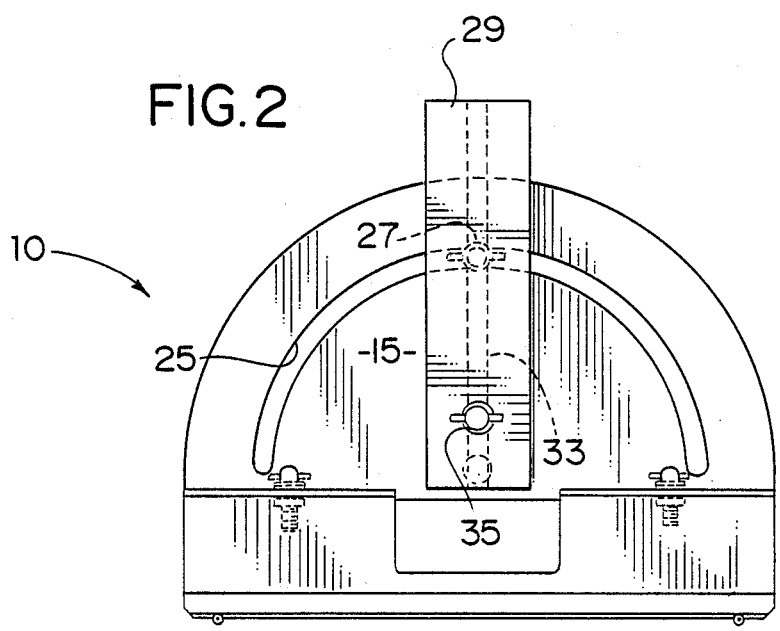
FIG. 2 shows a top view of the mitre gauge.
Figure 3:
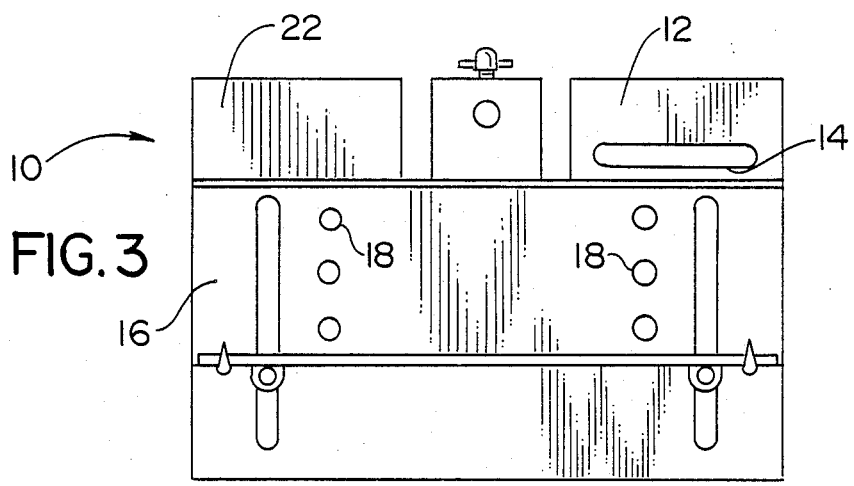
FIG. 3 shows a front view of the mitre gauge.
Figure 4:
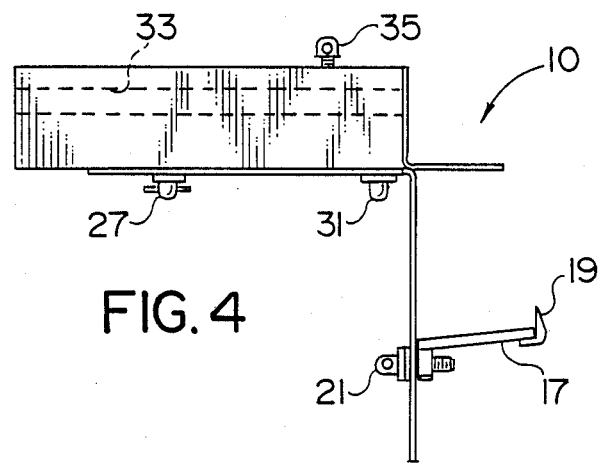
FIG. 4 shows a side view of the mitre gauge.

The portion 15 of the top plate includes an arcuate slot 25 in which rides the fastener 27 of a sleeve 29. The fastener 27 is best seen in FIG. 4 and is shown in phantom in FIG. 2. As further seen in FIG. 4, a further fastener 31 pivotably attaches the sleeve 29 to the portion 15 of the top plate 11 for pivoting movement with respect thereto as guided in the slot 25 by the fastener 27. When the sleeve 29 has arrived at the desired orientation with respect to the top plate 11 portion 15, the fastener 27 may be suitably tightened to affix the position of the sleeve 29 with respect to the top plate 11. The sleeve 29 includes a passageway 33 which may be entered by the fastener 35 for a purpose to be described in greater detail hereinafter.

A vertical plate 12 extends upwardly from the top plate 11 and includes a horizontally elongated slot 14 therein for a purpose to be described in greater detail hereinafter. A further downwardly extending plate 16 has the slots 23 therein which were described hereinabove, as well as a plurality of holes 18 also for a purpose to be described in greater detail hereinafter. FIG. 4 shows the angled configuration of the bottom plate 17 which best facilitates clamping action.

The upstanding plate 22 is merely provided to aesthetically balance the appearance of the vertical plate 12.

Figure 5:
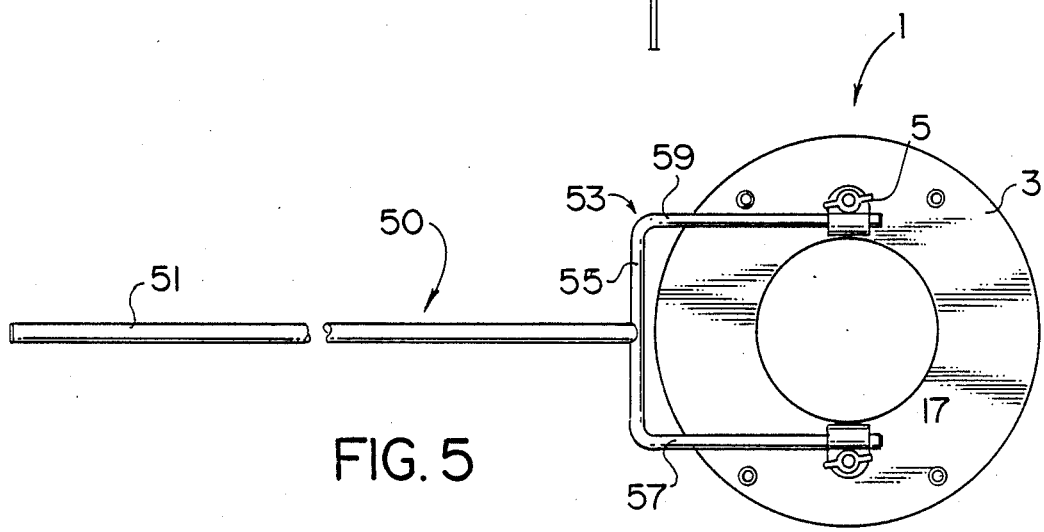
FIG. 5 shows a top view of a beam forming a part of the inventive system.
Figure 6:
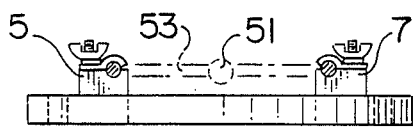
FIG. 6 shows an end view of the attachment of the beam to a router.

With reference, now, to FIGS. 5 and 6, it is seen that the beam 50 includes an elongated rod 51 having attachment means 53 at one end thereof. In the example shown in FIGS. 5 and 6, the attachment means 53 consists of a first rod 55 perpendicular to the rod 51, and having two perpendicular legs 57, 59 attached thereto.

FIGS. 5 and 6 show the underside of a router 1 having a base 3 with attachment members 5, 7 thereon. As should be understood, the beam 50 may be attached to the base 3 of the router 1 by sliding the legs 57, 59 into openings formed in the respective attachment members 7, 5 of the base 3 of the router 1 and then suitably tightening the legs 57, 59 in assembled position thereon.

With reference to FIGS. 5 and 6, taken in conjunction with FIGS. 1-4, it should be understood that the rod 51 of the beam 50 is intended to be slidably inserted into the passage 33 of the sleeve 29. With the beam 50 so installed on the sleeve 29 with the router 1 attached thereto, two general modes of operation may be carried out. Firstly, with the clamp formed by the plates 13, 17 being loosened, the fastener 35 may be tightened about the rod 51 to fix its position within the passage 33 and the entire mitre gauge 10 may be slid along the edge of a piece of wood to allow a straight line to be formed. Alternatively, with the fastener 35 loosened, and the sleeve 29 adjusted to any angular position with respect to the top plate 11 of the mitre gauge 10 through interaction of the fastener 27 in the arcuate slot 25, the rod 51 may be moved in or out of the passage 33 to cause corresponding movements of the router 1.

Of course, the attachment means 53 of the beam 50 is intended to merely be exemplary of the types of attachment means which may be incorporated into the beam 50. The attachment means 53 is merely provided so as to correspond with corresponding structure on the base of the router which is being used in conjunction therewith.

With reference, now, to FIGS. 7 and 8, a base 40 is seen to include an elongated flat member 41 on which is mounted a plurality of locking sleeves 43 each of which includes a passageway 45 therethrough in which may intrude a fastener bolt 47. On a face of the flat member 41 opposed to the face on which the locking sleeves 43 are mounted, a pointed member 49 is provided for a purpose to be described in greater detail hereinafter.

As further seen in FIG. 7, a further separate locking sleeve 43a is provided which includes a passageway 45a, fastening means 47a, and a pointed member 49a. The locking sleeve 43a is provided for a purpose to be described in greater detail hereinafter.

With reference to FIGS. 7 and 8, taken in conjunction with FIGS. 1-6 and 13, it should be understood that the rod 51 of the beam 50 may be inserted through the aligned locking sleeves 43 on the base 40 with the pointed member 49 oriented at a desired center for a desired radius. In such position, with the rod 51 extending through the aligned passages 45 of the locking sleeves 43, and without the use of any part of mitre gauge 10, the pointed member 49 may be embedded in a piece of wood at a desired radius from the cutting implement of the router 1 to allow the router 1 to be used to make circular arcs. For centers of rotation located off the piece of wood, use of the mitre gauge 10 is required. However, for arcs with centers on the wood only the base 40 or locking sleeve 43a need be used. The mitre gauge 10 must be totally removed from the apparatus or assembly for these latter mentioned arcs to be made otherwise they would not be possible to create. As should be understood, the fasteners 47 may be loosened allowing the base 40 to be reciprocated with respect to the rod 51 in a direction toward or away from the router 1, as desired, to adjust the radius of a circular arc to be performed by the router 1 by adjusting the distance between the pointed member 49 and the cutting implement of the router 1. It should be further understood from these figures that the base 40 may be reversed with respect to the beam 50 so that the pointed member 49 is close to the legs 57, 59 of the base 50 so that circular arcs of smaller radii may be made. In fact, it should also be understood that in order to perform these functions, it is not necessary to include the mitre gauge 10 in the set-up. Rather, the beam 50 and base 40 may be assembled together in one or the other orientation as described above with the legs 57, 59 of the beam coupled to the router 1, base 3.

The purpose for the sleeve 43a is better understood with reference to FIG. 14, wherein it is seen that the sleeve 43a may be mounted directly on the rod 51 of the beam 50 to cut circular arcs without the need for including the mitre gauge 10 and base 41. Generally speaking, the configuration of parts shown in FIG. 14 is used where the desired radius of curvature is different than that which may be properly accomplished through the use of the base 40.

Figure 16:
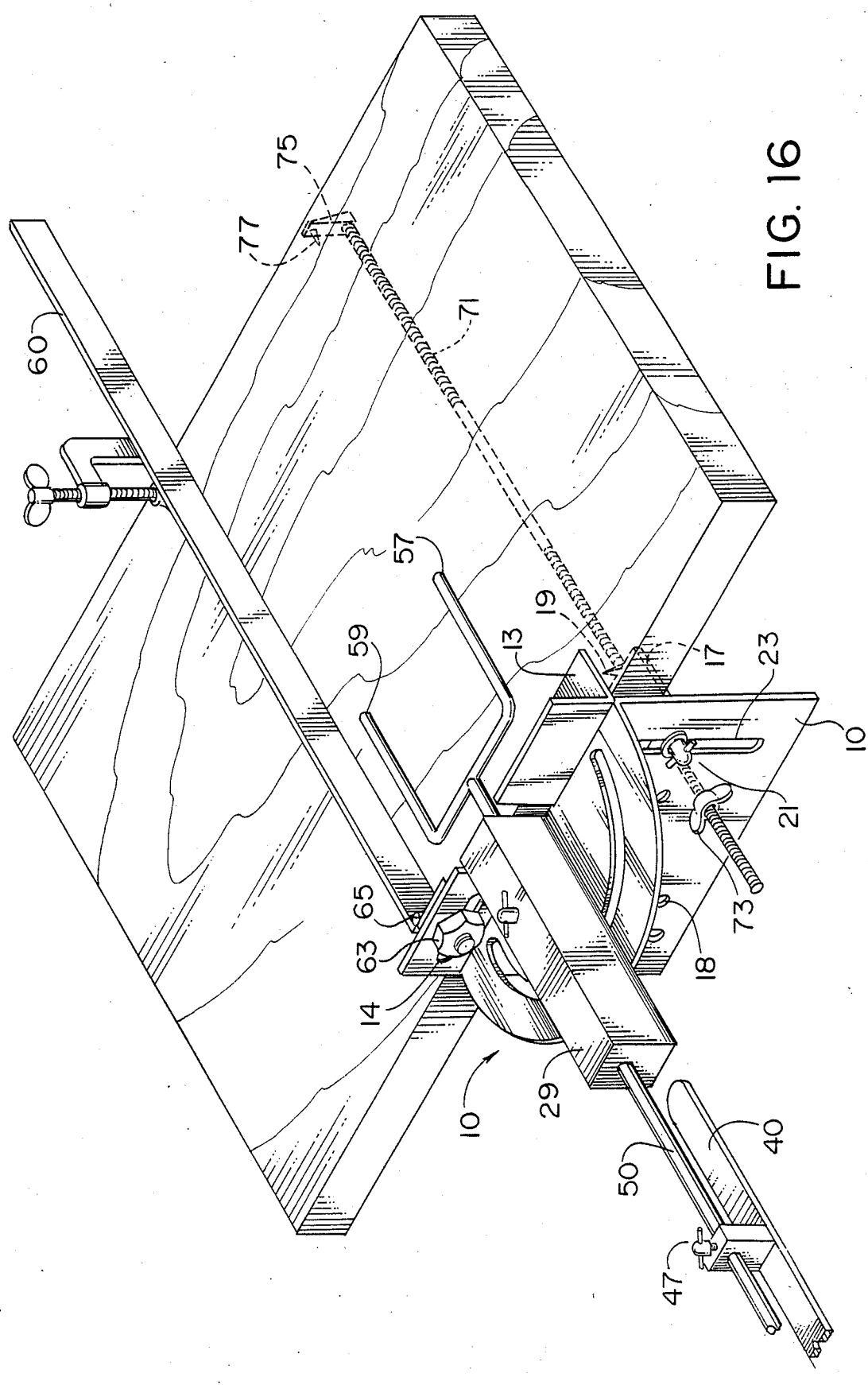
FIG. 16 shows a perspective view of the mitre gauge, fence, threaded rod clamp and beam as operatively mounted on a piece of wood for creating a dado cut with the threaded rod clamp engaged for additional clamping.

With reference to FIG. 9, it is seen that a threaded rod clamp 70 includes an elongated threaded rod 71 having a threaded fastener 73 threadably mounted thereon, and including the further provision of a perpendicular leg 75 having a pointed member 77 extending and angled away from the router bit. The pointed member 77 allows the threaded rod clamp to be fastened on the opposite edge of a piece of wood from beneath the piece of wood with the rod 71 extending through one of the openings 18 in the gauge 10, to allow the inventive system to be fully clamped to guide the router 1 in conjunction with the fence 60 in making rabbet cuts and mitre cuts. An exemplary mounted position of the threaded rod clamp 70 is best seen with reference to FIG. 13. FIG. 16 shows the entire set-up if the threaded rod clamp is to be used for additional clamping for a dado cut.

With reference to FIG. 10, the fence 60 is shown. FIG. 13 shows the fence 60 in mounted position for storage on the gauge 10 while FIG. 16 shows the fence in use. With reference back to FIG. 10, it is seen that the fence 60 includes an elongated angle iron 61 having attachment means 63 at one end mounted thereto by virtue of a hinge 65 allowing the angle iron 61 to pivot with respect to the attachment means 63. The angle iron 61 is used because it provides a portion 67 which lies flat on the surface of a piece of wood allowing the use of a clamp (not shown) to clamp the fence on the piece of wood at any desired pivoted orientation thereof to guide the router 1 in straight cuts. By adjusting the angular position of the angle iron 61, the angle of a cut may be correspondingly adjusted.

The fence 60 is designed to be used in conjunction with the gauge 10 and the router 1 to allow the performance of long vertical cuts such as dados, rabbets and mitres. Comparison of FIGS. 11 and 12 shows two adjusted positions of the sleeve 29 by virtue of the fastener 27 interacting with the arcuate slot 25 of the top plate 11 portion 15 of the gauge 10. The FIG. 11 orientation is intended to show the gauge 10 clamped on a piece of wood with the fastener 35 loosened to allow sliding movements of the rod 51 of the beam 50 with respect to the passage 33 in the sleeve 29 to allow long straight vertical cuts in conjunction with the fence.

The view of FIG. 12 is intended to show the sleeve 29 pivoted from the position shown in FIG. 11 to allow sliding movements of the rod 51 of the beam 50 with respect to the passage 33 to allow angled cuts. If desired, for added stability, the fence may also be used in this set-up.

If desired, the passage 33 of the sleeve 29, as well as the outer configuration of the rod 51, may be provided with corresponding D-shaped cross-sections to prevent rotations about the axis of the rod 51 as the rod 51 is reciprocated within the sleeve 33.

FIG. 15 shows a piece of wood 90 in which various cuts have been performed using the inventive system. The cuts are a mitre cut 91, a dado cut 93, a lap cut 95, and a rabbet cut 97. As should be understood by those skilled in the art, these cuts facilitate the joining of the piece of wood 90 at the respective cuts with other pieces of wood.

With the inventive system having been described in detail in terms of its various components hereinabove, the versatility, ease of use, and simplicity of the inventive system should be well understood. To applicant's knowledge, the inventive system is different from any other router guiding system known. As explained above, the mitre gauge 10 may be clamped directly to a piece of wood and/or a series of components such as the fence, threaded rod, beam and base may be selectively attached thereto to allow different functions as explained above to be carried out with a router. As should be also understood, the adjustability of the inventive system for various tasks is quite easy to carry out. Merely by tightening or loosening clamps, fasteners, etc., the orientation of the parts may easily be altered and varied for the performance of various tasks. Thus, through the use of the inventive system, functions may be carried out including the following:

(1) very small to very large circles;
(2) arcs having their centers of rotation on or off a piece of wood;
(3) cuts which are angled with respect to the dimensions of the piece of wood, which cuts may be made perfectly straight;
(4) straight vertical cuts, allowing dados, rabbets, mitres, laps, etc.;
(5) horizontal cuts which are perfectly straight;
(6) lettering through the use of a router using many desired lettering styles. This is accomplished by combining together the above described functions of creating circles of varying radii as well as straight and angled lines.

As such, an inventive has been disclosed in terms of preferred embodiments thereof and orientations of use which fulfill each and every one of the objects of the invention as set forth hereinabove and provide a new and improved universal router trammel system having features nowhere taught or suggested in the prior art and of great utility and novelty.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved system for guiding a router device in performing operations on a piece of material, comprising:
   (a) a mitre gauge having a body and including:
      (i) clamping means on said body for clamping said mitre gauge to said material;
      (ii) a sleeve having a passageway therethrough and pivotably mounted on said body;

(iii) said body having an arcuate slot and said sleeve having guide means riding in said slot for guiding pivoting movements of said sleeve;

(iv) said sleeve including first locking means for locking said sleeve in a desired orientation with respect to said body;

(b) attachment means for attaching a router device to said body, said attachment means including a single elongated rod slidably receivable in said passageway and an attachment member at one end of said rod for attaching said rod to said router device; and (c) second locking means selectively actuable for locking said rod in a desired position of rotation and extension in said passageway.

2. The invention of claim 1, wherein said guide means and first locking means comprise a threaded fastener extending through said slot, threadably received in a threaded bore in said sleeve and tightenable to lock said sleeve in a said desired orientation.

3. The invention of claim 1, further including a threaded rod clamp attachable to said body at one end and having another end having a pointed member adapted to dig into said material, said threaded rod clamp being used to facilitate additional clamping for the forming of rabbet cuts and mitre cuts in said material.

4. The invention of claim 1, further including a base attachable to said body in alignment with said sleeve, said base including at least one further sleeve having a further passageway therethrough in alignment with said passageway and sized to slidably receive therethrough said elongated rod, and said further sleeve having third locking means selectively actuable to lock the position of said rod in said further passageway.

5. The invention of claim 1, wherein said attachment member comprises a pair of legs adapted to be attached to complementary structure on said router.

6. The invention of claim 1, further including a fence removably attachable to said body at one end thereof, said fence having a clamp at another end thereof to clamp said fence on said material to guide said router in straight cuts.

7. The invention of claim 1, wherein said material is wood.

8. The invention of claim 4, wherein said at least one further sleeve comprises a plurality of further sleeves.

9. The invention of claim 6, further including a threaded rod clamp attachable at one end to said mitre gauge and at another end to said piece of material, said threaded rod clamp being adjusted as to length of extension.

* * * * *